United States Patent [19]

Kitamura et al.

[11] 4,367,498
[45] Jan. 4, 1983

[54] INTERVAL DETECTION FOR AUTOMATIC CUEING CONTROL SYSTEMS

[75] Inventors: Masatsugu Kitamura; Hideo Onoye, both of Yokohama, Japan

[73] Assignee: Victor Company of Japan, Limited, Yokohama, Japan

[21] Appl. No.: 164,162

[22] Filed: Jun. 30, 1980

[30] Foreign Application Priority Data

Jun. 28, 1979 [JP] Japan .................................. 54-81642

[51] Int. Cl.³ ...................... G11B 15/16; G11B 15/52; G11B 27/22
[52] U.S. Cl. .................................. 360/72.1; 360/72.2; 360/73
[58] Field of Search ...................... 360/72.1, 72.2, 73, 360/71, 74.1, 74.4

[56] References Cited

U.S. PATENT DOCUMENTS

| | | | |
|---|---|---|---|
| 3,541,271 | 11/1970 | Joslow et al. | 360/72.1 |
| 4,115,821 | 9/1978 | Okada | 360/72.1 |
| 4,237,497 | 12/1980 | Trevithick | 360/72.1 |
| 4,288,823 | 9/1981 | Yamamoto et al. | 360/72.2 |
| 4,290,090 | 9/1981 | Yamamoto et al. | 360/72.1 |

OTHER PUBLICATIONS

IBM Technical Disclosure Bulletin, N. K. Arter et al., High Speed Search and Step Distance on a Wrapped Capstan, vol. 18, No. 12, May 1976, pp. 3924-3925.

Primary Examiner—Alfred H. Eddleman
Attorney, Agent, or Firm—Lowe, King, Price & Becker

[57] ABSTRACT

A tape reproducing system selectively reproduces programs recorded on a recording tape wound on supply and takeup reels and drives the reels at selected fast forward and rewind speeds so that the rotation speed of said reels varies nonlinearly as a function of tape diameter wound on one of said reels. To detect inter-program pauses between programs to replay the recorded programs, the duration of each sensed pause is detected. A memory stores a set of data so each datum of the set represents tape speed as a function of the varying speed of one of the reels. The stored data are read out of the memory in response to the detected rotational speed of one reel. The detected duration is corrected in response to data readout of the memory. The corrected duration is compared with a reference value to generate a control signal for replaying the recorded programs at a playback speed.

6 Claims, 7 Drawing Figures

FIG. 1

| FIG. 1A | FIG. 1B |

| FIG. 1A | FIG. 1B |

FIG. 2
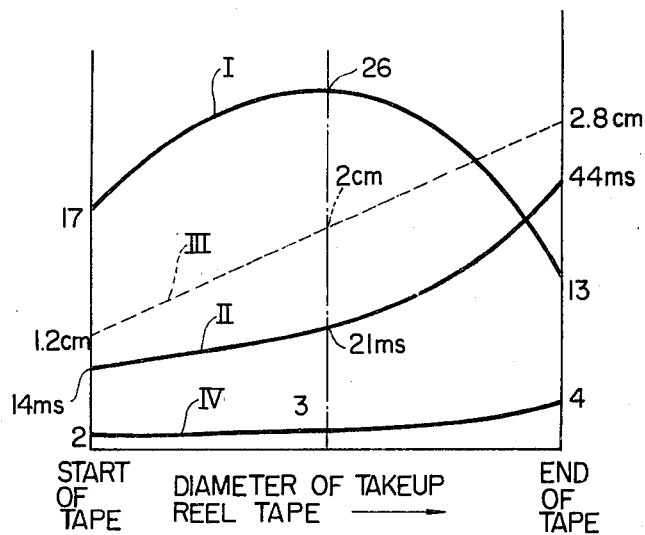
FIG. 3A
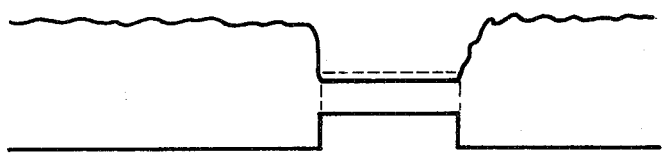
FIG. 3B
FIG. 3C
FIG. 3D
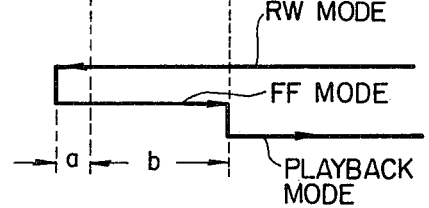

INTERVAL DETECTION FOR AUTOMATIC CUEING CONTROL SYSTEMS

BACKGROUND OF THE INVENTION

The present invention relates generally to tape reproducing system, and more specifically to a method and an apparatus for detecting inter-program pauses between successively recorded programs. The invention also relates to a tape reproducing system in which a desired recorded program is automatically detected and reproduced in response to a manual instruction.

Operating a tape recorder in search of a desired material from among successively recorded programs is tedious. Automatic detection of a program is desired to eliminate this problem. To permit automatic program searching the tape is driven in the fast-forward or rewind mode in slight contact with a playback transducer head for high-speed reproduction of the recorded material so a sensing circuit can detect inter-program pauses. Since the tape is driven at a constant speed by a capstan-pinch roller arrangement during playback, the successively recorded materials are spaced an equal distance apart throughout the length of the tape. However, during the fast-forward or rewind mode the tape is driven at a high speed by takeup reel or supply reel, respectively, to which the rotary torque of a motor is coupled by means of a known slip-friction mechanism. However, because of the higher speed of rewind and fast forward operations the motor tends to be overloaded as a function of the amount of tape wound on that reel. As a result, the rotational speed of each reel varies nonlinearly as a function of the diameter of the tape wound on the power-coupled reel.

Therefore, the detected interval of the inter-program pause portions varies significantly from point to point along the length of the tape. On the other hand, the signal level of each recorded program varies significantly so that in certain instances it is reduced to a minimum level. If such low level signals persist for a substantial period of time, they are likely to be detected as inter-program pauses.

U.S. Pat. No. 4,288,823 discloses an apparatus for and method of distinguishing pauses to control replay in a type reproduction system wherein a speed sensor generates a tape speed signal which is coupled to a first counter and converted into a corresponding tape speed digital value. A pause detector detects programs and pauses to derive the duration of each detected pause. A second counter converts an output of the pause detector into a corresponding pause-duration digital value. The tape speed and pause-duration digital values are compared against each other to generate a control signal for replaying the recorded programs. However, the nonlinear relationship between the tape and reel speeds is not taken into account. Thus, the comparison does not serve as an accurate indication of inter-program pauses.

SUMMARY OF THE INVENTION

The present invention contemplates using a memory to store a set of correction data each representing the tape speed as a function of the varying speed of a driving reel, either supply or takeup reel. A driving reel speed sensor derives address information for retrieval of data stored in the memory. The duration of each pause is detected and corrected by the data retrieved from the memory; the corrected pause data are compared with a reference value to generate a control signal for replaying the programs.

Therefore, an object of the invention is to accurately detect inter-program pauses between programs recorded on a recording tape driven at variable high speeds by correlating the varying speed of a driving reel with the varying speed of the tape during cue, review and automatic search modes.

Another object of the invention is to permit automatic cueing or searching of a desired program in response to an entered program number. This object is achieved by counting the number of detected intervals and detecting a match between the count and the entered program number. Since there is a certain amount of inertia in the tape drive mechanism, the tape has a tendency to overrun from the point of detection of the match. It is preferable to rewind the tape by a variable amount as a function of the location of the detected program.

BRIEF DESCRIPTION OF THE DRAWINGS

These and other objects, features and advantages of the present invention will become apparent from the following description when read in conjunction with the accompanying drawings, in which:

FIG. 2 is a graphic illustration of the various tape operating factors as a function of the location of the head contacting portion of the tape with respect to the starting and terminating ends of the tape; and FIGS. 3a to 3d are timing diagrams useful for describing the operation of the cueing control system of FIG. 1.

DETAILED DESCRIPTION

Figures 1, 1A:
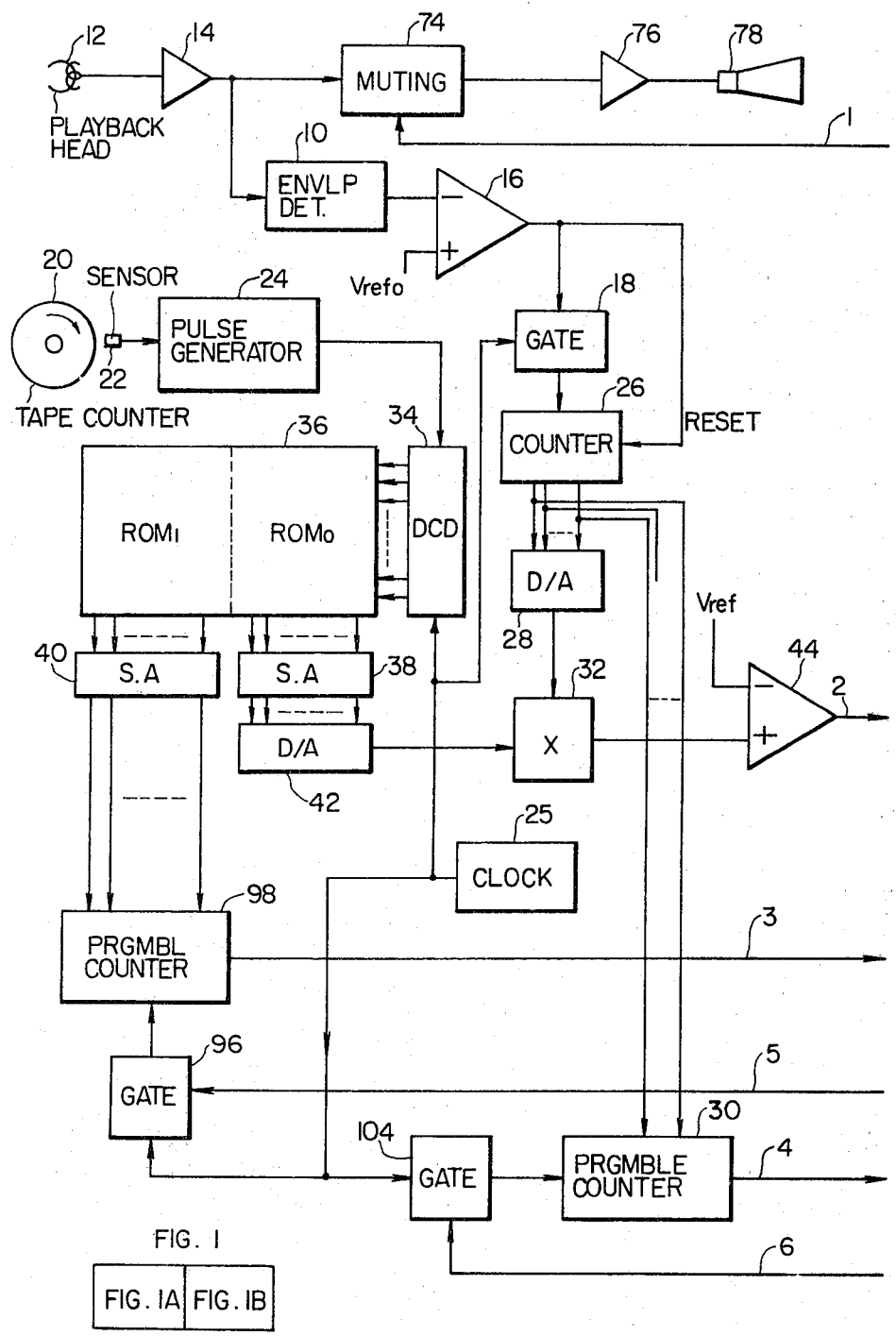
FIG. 1 is an illustration of a schematic functional block diagram of an automatic cueing control system of the invention, separately shown in FIGS. 1A and 1B.
Figure 1B:
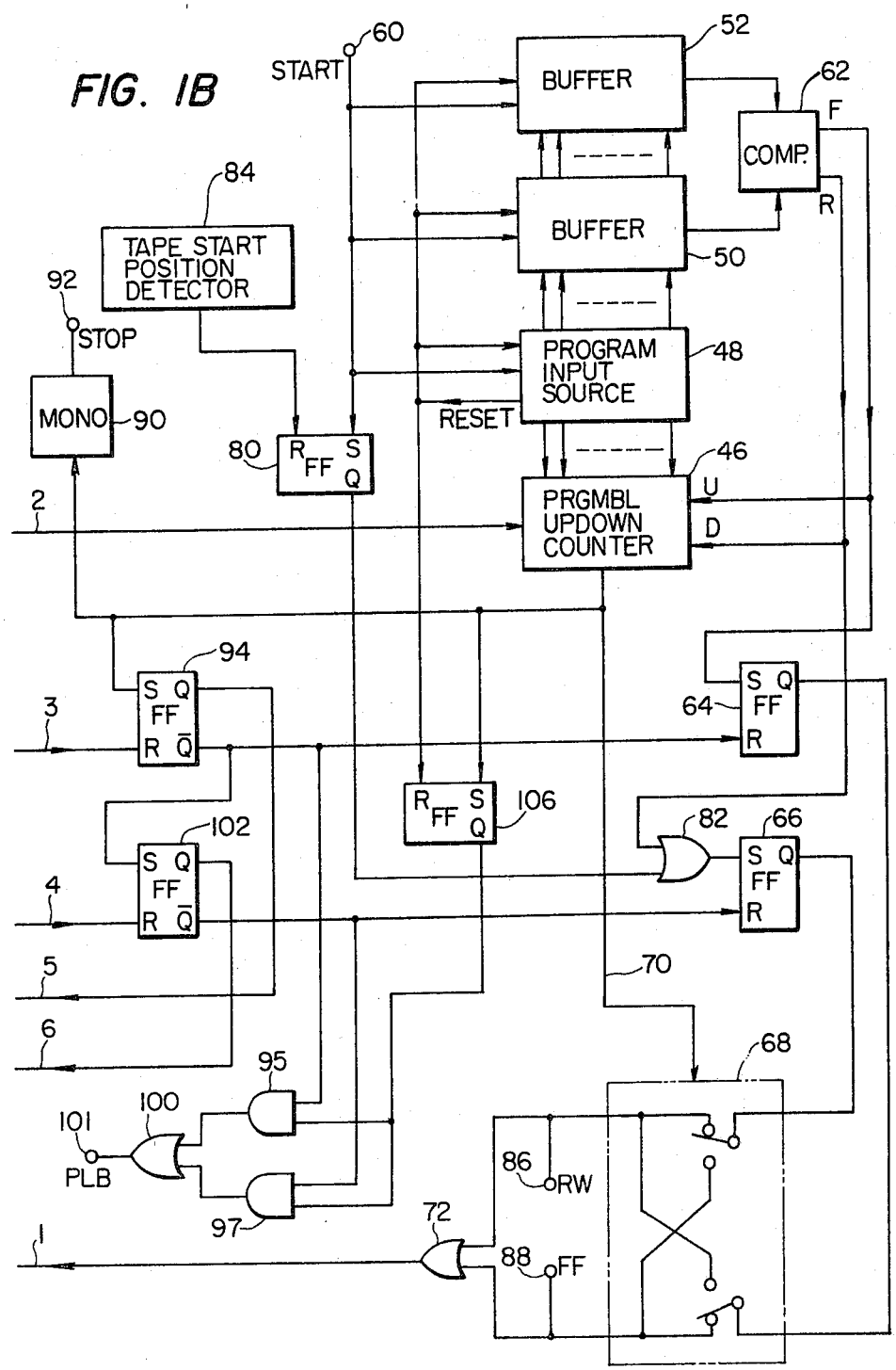

An automatic cueing control system for a tape player is schematically illustrated in FIGS. 1A and 1B. The control system generates various speed control signals for the speed control mechanism of a tape recorder, not shown, for the sake of simplicity.

The control system comprises an envelope detector 10 which is coupled to the playback head 12 via an amplifier 14 to detect the envelope of the output signal of the transducer head 12; the envelope output of detector 10 is fed to an inverting input of a comparator 16 where it is compared with a reference voltage $V_{ref0}$ which represents a threshold level. If the envelope detected signal is below this threshold level, the output of the comparator 16 is a high voltage signal which indicates that the reproduced signal is at a minimum level. The output of the comparator 16 is coupled to the control input of a gate circuit 18 to allow passage of clock pulses from a clock source 25 to a count input of a binary counter 26 which is reset in response to the leading edge transition of the high-level output of the comparator 16. The binary counter 26 provides an output which is a binary representation of the interval during which the envelope signal remains at the minimum signal level, the output of the counter 26 being connected to a digital-analog converter 28. The analog representation of the measured interval is applied to an input of an analog multiplier 32. The output of the counter 26 is also connected to a programmable counter 30, having a function described later.

In proximity to the periphery of a tape counter 20 is mounted a electromagnetic or photoelectrical sensor 22 that generates a pulsating signal at a frequency proportional to the rotation speed of the wheel mounted on the tape counter 20. Since the tape counter 20 is driven synchronously with the rotation speed of a takeup reel of the tape player, not shown, the pulsating signal frequency varies as a function of the takeup reel rotation speed. In a cueing mode in which the takeup reel is driven in the fast-forward or rewind direction by a motor through a clutch mechanism, the takeup reel rotation speed and therefore the interval between successive pulsating signals of the sensor 22, vary as a function of the diameter of the convolutions of the tape wound on the takeup reel. As described later in detail, the pulsating signal interval varies nonlinearly as a function of the location or distance of the head contacting portion of the tape with respect to a tape end and provides an indication of the location of the tape portion being reproduced by the playback head 12.

The output signal of sensor 22 is fed to a pulse generator or waveform shaping circuit 24; circuit 24 defines the binary level of the output signal of sensor 22. The output of generator 24 is fed to a reset input of a binary counter or decoder 34, also responsive to clock pulses from the clock source 25. Therefore, the output of the decoder 34 is a binary representation of adjacent outputs of interval between the pulse generator 24 and hence representative of the location of the head contacting portion of the tape with respect to the tape end when the tape recorder is operated in the cueing mode.

The binary output of the decoder 34 is connected to address lines of a read-only memory 36 which comprises memory units $ROM_0$ and $ROM_1$. In the $ROM_0$ unit is stored a set of correction data which are binary representations of a function describing the relationship between the location of the head contacting portion of the tape with respect to the tape end, as represented by the output of the decoder 34, and the varying speed of the tape with respect to the playback head in the cueing mode, as represented by a set of integral multiples of the normal playing speed of the tape player. More specifically, the stored correction data are a binary representation of these integral multiples and each datum is stored in a respective one of a plurality of memory locations addressed by the binary output of the decoder 34.

In the $ROM_1$ is stored a set of overrun length data, also addressed by the same binary output of the decoder 34; the function of the $ROM_1$ is described later.

The addressed data from the $ROM_0$ is delivered through sense amplifier 38 and thence to a digital-analog converter 42 having an analog output connected to another input of the multiplier 32. Therefore, the measured interval, represented by the output of the D/A converter 28, is multiplied by the correction data or integral multiple retrieved from the $ROM_0$ in accordance with the location of the program being reproduced, so that the output of the multiplier 32 represents an interval which would be derived if the tape is driven at a constant speed with respect to the playback head.

The output of a multiplier 32 is applied to the noninverting input of a comparator 44 where it is compared with a reference voltage $V_{ref1}$ representing a predetermined interval. If the corrected interval is equal to or greater than this predetermined interval, the comparator 44 generates a high voltage output which is an indication that the minimum level interval which has just passed through the playback head 12 is a valid interval between recorded programs. The output of the comparator 44 is supplied to a programmable updown counter 46, having a program input connected to be responsive to program input source 48. Program input source 48 may comprise one or more manually operated keys or buttons to enable entry of a program number corresponding to a desired recorded program. The source 48 may include a reset key for resetting the data previously stored and replacing it with a subsequent program number. A pair of buffer memories 50 and 52 are connected to receive entered program numbers from the input source 48 in succession, whereby the stored contents of the memory 52 correspond to the data which precede the data stored in the memory 50.

Data are successively transfered from the program input source 48 to the memory 50 and thence to the memory 52 by the reset pulse from the program input source 48 whenever a new program number is entered into the source 48. As described later, a start signal is applied to a terminal 60 to clear the contents of the memories 50, 52 and the input source 48.

Digital comparator 62 compares the stored values in buffer memories 50 and 52 to determine the location of the entered program relative to the location of the previously entered program. Comparator 62 generates fast-forward (FF) and rewind (RW) signals on separate output leads F and R; signals FF and RW are coupled to the set inputs of flip-flops 64 and 66 and to the up-count and down-count terminals of the programmable up-down counter 46, respectively.

The Q output terminals of the flip-flops 64 and 66 are connected to an electronic switch 68, controlled in response to an output signal from the updown counter 46; the counter output signal is supplied via lead 70 to switch to reverse the application of signals from the flip-flops 64, 66 to terminals 86 and 88.

The fast-forward or rewind signal is coupled through OR gate 72 to lead 1 to the control terminal of a muting circuit 74 to suppress the signal level of the reproduced audio signal during an automatic cueing operation. The output of the muting circuit 74 is coupled through an amplifier 76 to a loudspeaker or an earpiece 78 so that no perceptible audio signal is derived from the speaker or earpiece while circuit 74 is muting the output of amplifier 14.

Before describing the operation of the embodiment of the invention, reference is made to FIG. 2. Curve I is an illustration of the tape speed plotted as a function of the varying diameter of the tape wound on the takeup reel during fast-forward or rewind mode. As shown, the tape speed during such mode is 17 times faster than the playback mode speed at the starting end of the tape, reaches a maximum value corresponding to 26 times as high as the playback mode speed at midpoint of the tape length, and finally reaches a minimum value which is 13 times the playback speed at the terminating end of the tape. Curve II is a plot of the pulse interval represented by the output of the decoder 34, as a function of the diameter. The pulse interval varies nonlinearly from the minimum value of 14 milliseconds at the starting end of the tape to the maximum value of 44 milliseconds at the terminating tape end. It follows from the curves I and II that the distance travelled by the tape during a pulse interval in the fast-forward or rewind mode varies substantially linearly as indicated by a broken-line III. Curve IV indicates the amount of tape which is to be rewound or fast-forwarded to compensate for the length of overrun which is encountered at the instant the tape is stopped upon detection of a desired program.

The data stored in the $ROM_0$ represent a transfer function for the relationship between curves I and II, while the data stored in the $ROM_1$ represent another transfer function which describes the relationship between curves II and IV.

The operation of the control circuit of FIGS. 1A and 1B is as follows. With a cassette tape or open-reel tape is set in position, a start key, not shown, is manually operated to apply a start signal to terminal 60 to clear the buffer memories 50 and 52 and any data stored in the program input source 48. The start signal is also applied to the set input of a flip-flop 80. The resulting Q output of the flip-flop 80 is supplied through an OR gate 82 to the set input of flip-flop 66 to generate a rewind signal. If the tape is already in the starting position, a tape start position detector 84 is activated and resets the flip-flop 80. If the tape is not in the starting position, the high-level Q output of the flip-flop 66 is delivered via terminal 86 to the driving mechanism of the tape recorder to rewind the tape automatically to the starting position. With the tape being set in the starting position, a desired program number is manually entered into the program input source 48. A reset key, not shown, is manually operated to apply a reset signal to memories 50, 52 to transfer the data loaded into the input source 48 to the buffer memory 50 and to the programmable updown counter 46. The transferred contents of memory 50 are then compared with the all zero bits of memory 52 in the digital comparator 62, which supplies a fast-forward signal to the upcount terminal of counter 46 and to the set input of flip-flop 64. The high-level Q output of flip-flop 64 is delivered via a terminal 88 as a fast-forward drive signal to the drive mechanism of the tape recorder, thereby starting a search for the recorded program having a program number entered into the input source 48.

During this cueing or search mode, the playback head 12 is slightly in contact with the tape surface, so that it produces a high level output when the head 12 encounters each recorded program. The reproduced signal derived from amplifier 14 is supplied to the muting circuit 74, where it is suppressed to a minimum level in the presence of a fast-forward or rewind drive signal which appears on terminal 86 or 88.

The envelope of the amplified signal is detected by envelope detector 10 and supplied to the inverting input of the comparator 16. Therefore, in response to playback head 12 encountering the portion of the tape where no signal is recorded, a high voltage output is supplied by comparator 16 to the gate circuit 18, so that as long as the non-recorded portion of the tape is moving past the playback head 12 the output pulses from the clock source 25 pass through gate 18 to the binary counter 26. The binary output of the counter 26 is thus representative of the number of such pulses and hence the time interval of an inter-program pause between successively recorded programs. The analog value of this time interval is supplied by digital-analog converter 28 to the multiplier 32 where it is multiplied by the compensating data retrieved from the $ROM_0$ in response to the clock count value of the decoder 34 which represents, as previously described, the instantaneous tape transport speed.

The modified analog output of the multiplier 32 thus represents the time interval which would be derived if the tape is transported at a constant speed with respect to the playback head 12. The output of the multiplier 32 is compared with the reference voltage $V_{ref}$ in the comparator 44 so that it provides a high level output if the detected time interval is greater than a specified value. Since the interval between successive programs has a predetermined uniform value, a momentary reduction of recorded signal level is not detected by the comparator 44. The output of the comparator 44 is counted in the programmable updown counter 46 which delivers an output when the count value reaches the preset count corresponding to the entered program number.

The occurrence of the output signal from the updown programmable counter 46 is an indication that the entered program is just detected, this output being applied to a monostable multivibrator 90 to generate a tape stop pulse for application to the tape driving mechanism and at the same time to the set input of a flip-flop 94 and to the switch 68. The high-level Q output of flip-flop 94 is applied through lead 5 to the control input of a gate 96 to feed clock pulses from the clock source 25 to a programmable counter 98 having a program input connected to the sense amplifier 40, so that the counter 98 is preset to the data representing the length of tape to be rewound so that reproduction may start from the starting end of the detected program in the playback mode which follows the subsequent overrun rewind mode.

Since the switch 68 is responding to the output of the counter 46, the fast-forward signal from the flip-flop 64 is coupled to the terminal 86 to rewind the tape until this flip-flop is reset in response to the high-level Q output of flip-flop 94 when the latter is reset by an output signal from the programmable counter 98. Therefore, the tape has been rewound by a specified length from the point where the tape was actually stopped. The Q output of flip-flop 94 is applied to an input of an AND gate 95, having another input is connected to the Q output of a flip-flop 106 which is set in response to the output of the counter 46, whereby the AND gate supplies a playback signal to the mechanism via OR gate 100 and terminal 101.

FIGS. 3a to 3b are respectively illustrations of waveforms appearing at the outputs of the envelope detector 10 and the comparator 16, while FIG. 3c is an illustration of the operational modes of the tape player in the above-described sequence.

In a subsequent cueing operation, the contents of the program input source 48 are altered to a new program number. In response to a reset signal, flip-flop 106 is reset, the contents of the memory 50 stored in the previous cueing operation are transferred to the memory 52 and the program data newly entered into the input source 48 are transferred to the memory 50 and to the programmable counter 46 to renew its preset value.

The stored contents of memories 50 and 52 are compared again in the comparator 62. If the subsequently entered program number is greater than the previously entered program number, the comparator 62 generates a fast-forward signal to repeat the above-described operation. Conversely, if the subsequently entered number is smaller than the previously entered number, the comparator 62 output is a rewind signal which is applied through OR gate 82 to the flip-flop 66, the Q output of the latter being coupled through switch 68 (in the normal switch position) and terminal 86 to the tape drive mechanism to rewind the tape. During this rewind operation the nonrecorded portions of the tape are detected and counted by the programmable updown counter 46 in the downcount mode until the count value thereof reaches the preset value. A tape stop signal is thus generated by the monostable multivibrator 90 in response to the output of the downcount-mode counter 46. The output of counter 46 controls switch 68 so the signal from the flip-flop 66 is applied to the terminal 88.

Since this search mode is in the direction opposite to the playback-mode direction, the tape should be subsequently moved in the fast-forward mode by a length equal to the overrun length "a" plus the nonrecorded portion "b" as seen from FIG. 3d.

To accomplish this, the output of the counter 46 is supplied to the flip-flop 94 to enable the gate 96 again whereby clock pulses are applied to the programmable counter 98 to generate an output when the clock count corresponds to the overrun-length data retrieved from the $ROM_1$. This output is applied through line 3 to the reset input of flip-flop 94. The Q output of flip-flop 94 thus goes high and triggers a flip-flop 102 into a set condition. The high-level Q output of flip-flop 102 is in turn applied through line 6 to a gate circuit 104 to clock the programmable counter 30. Since the preset count value of the programmable counter 30 represents the time interval "b", this counter generates an output when the starting point of the desired program reaches the playback head 12. This output signal is fed through line 4 to the flip-flop 102 to reset the latter. The Q output of flip-flop 102 is coupled to the reset terminal of flip-flop 66 to terminate the fast-forward signal which has been supplied through terminal 88 to the drive mechanism. In response to the flip-flop 102 being switched to the reset condition, an AND gate 97 is activated to provide a playback signal through OR gate 100 and terminal 101.

The embodiment of the present invention can also be realized readily by appropriately programming a microcomputer.

What is claimed is:

1. In a tape reproducing system for selectively reproducing programs recorded on a recording tape wound on supply and takeup reels and for driving said reels at selected fast forward and rewind speeds so that the rotation speed of said reels varies nonlinearly as a function of tape diameter wound on one of said reels, an apparatus for detecting inter-program pauses between programs to replay the recorded programs, said apparatus comprising:
   first sensor means for sensing the programs and the pauses on the recording tape and for detecting the duration of each sensed pulse;
   a memory storing therein a set of data, each datum of the set representing the speed of said tape as a function of the varying speed of one of said reels;
   second sensor means for detecting the rotational speed of said one reel;
   reading means for reading said stored data out of said memory in response to said detected rotational speed;
   means for correcting said detected duration in response to the data readout of said memory; and
   means for comparing said corrected duration with a reference value to generate a control signal for replaying the recorded programs at a playback speed.

2. The apparatus of claim 1, wherein said memory stores a set of second data, each datum of the set of second data representing the length of tape which overruns a reference point as a function of said varying speed of said one reel, further comprising means for reading said second data in response to said detected rotational speed, and means for moving said tape to said reference point in response to said second data readout of said memory.

3. The apparatus of claim 2, further comprising means responsive to said reels being driven at said rewind speed for stopping said reels in response to the occurrence time of said control signal and moving said tape at said fast forward speed as a function of said detected duration in addition to said overrun length.

4. A tape reproducing system having means for selectively reproducing programs recorded on a recording tape wound on supply and takeup reels and means for driving said reels at selected fast forward and rewind speeds so that the rotation speed of said reels varies nonlinearly as a function of the diameter of the tape wound on one of said reels, comprising:
   a first memory for sequentially storing therein program identification data in response to manual operation;
   means for comparing the sequentially stored identification data with each other to determine the relative values thereof to cause said driving means to drive one of the reels at said fast forward or rewind speeds;
   first sensor means for sensing the programs and the pauses on the recording tape and for detecting the duration of each sensed pause;
   a second memory storing a set of data, each datum in the data set in the second memory representing the tape speed as a function of the varying speed of said one reel;
   second sensor means for detecting the rotational speed of said one reel;
   reading means for reading said stored data out of said second memory in response to said detected rotational speed;
   means for correcting said detected duration in response to the data readout of said second memory;
   means for comparing said corrected duration with a reference value to generate a control signal;
   means for counting said control signal; and
   means for detecting a match between the count and each of said program identification data for replaying said recorded programs at a playback speed.

5. A tape reproducing system of claim 4, wherein said second memory further stores a set of second data, each datum of the second set representing the length of tape which overruns a reference point as a function of said varying speed of said one reel, further comprising means for reading said second data in response to said detected rotational speed, and means responsive to said match occurring for moving said tape to said reference point according to the data in said second data readout of said second memory.

6. A tape reproducing of claim 5, further comprising means responsive to said reels being driven at said rewind speed for stopping said reels in response to the said match occurring and moving said tape at said fast forward speed as a function of said detected duration and said overrun length.

* * * * *